United States Patent [19]

Chun

[11] Patent Number: 5,034,592
[45] Date of Patent: Jul. 23, 1991

[54] PROCESS AND APPARATUS FOR REDUCING SLAG BUILD-UP ON CHUTE SURFACES

[75] Inventor: Victor L. Chun, Holland, Pa.

[73] Assignee: Murata Wiedemann, Inc., King of Prussia, Pa.

[21] Appl. No.: 549,950

[22] Filed: Jul. 9, 1990

[51] Int. Cl.$^5$ ............................................. B23K 26/00
[52] U.S. Cl. ............................ 219/121.84; 219/121.67
[58] Field of Search ............ 219/121.6, 121.85, 121.67, 219/121.72, 121.84, 121.33, 121.58, 121.59, 121.36, 121.35, 121.44

[56] References Cited

U.S. PATENT DOCUMENTS 4,063,059 12/1977 Brolund et al. ............ 219/121.58 X
4,338,507 7/1982 Scott ........................ 219/121.36 X Primary Examiner—C. L. Albritton
Attorney, Agent, or Firm—John R. Benefiel

[57] ABSTRACT

A process and apparatus for protecting a confinement chute from slag build-up caused by accumulation of spatter particles generated by cutting a workpiece by a hot discharge such as a plasma arc or laser, including a high velocity flow of gas such as air directed over the chute internal surface to deflect and cool the spatter particles. The surface is chrome plated to reduce the tendency for adhesion of the particles to the surface.

5 Claims, 1 Drawing Sheet

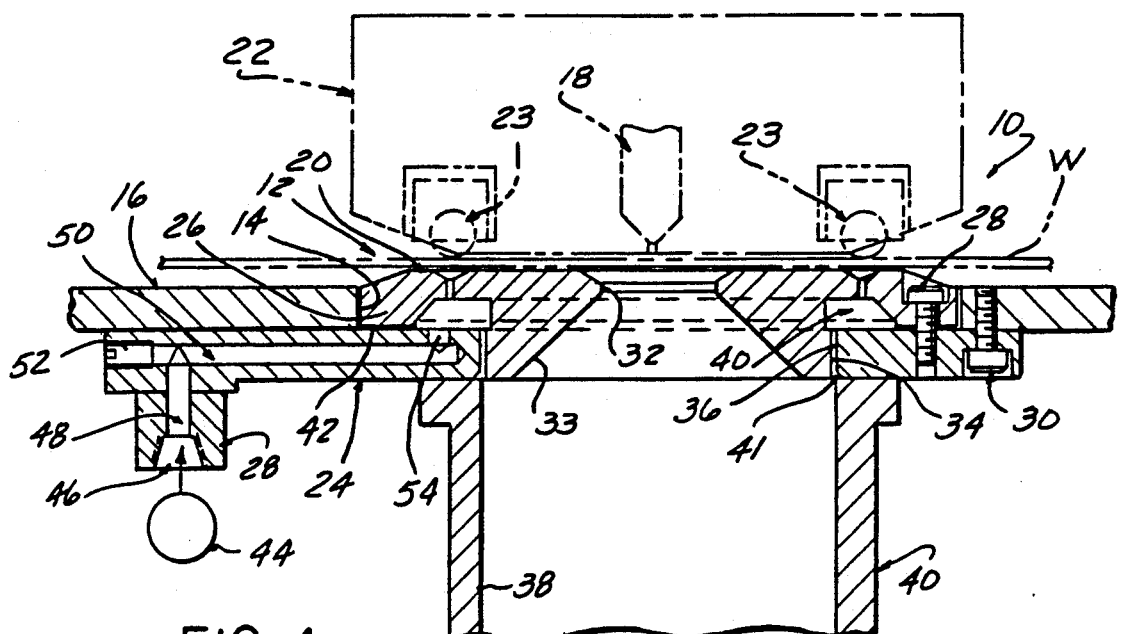
FIG-1
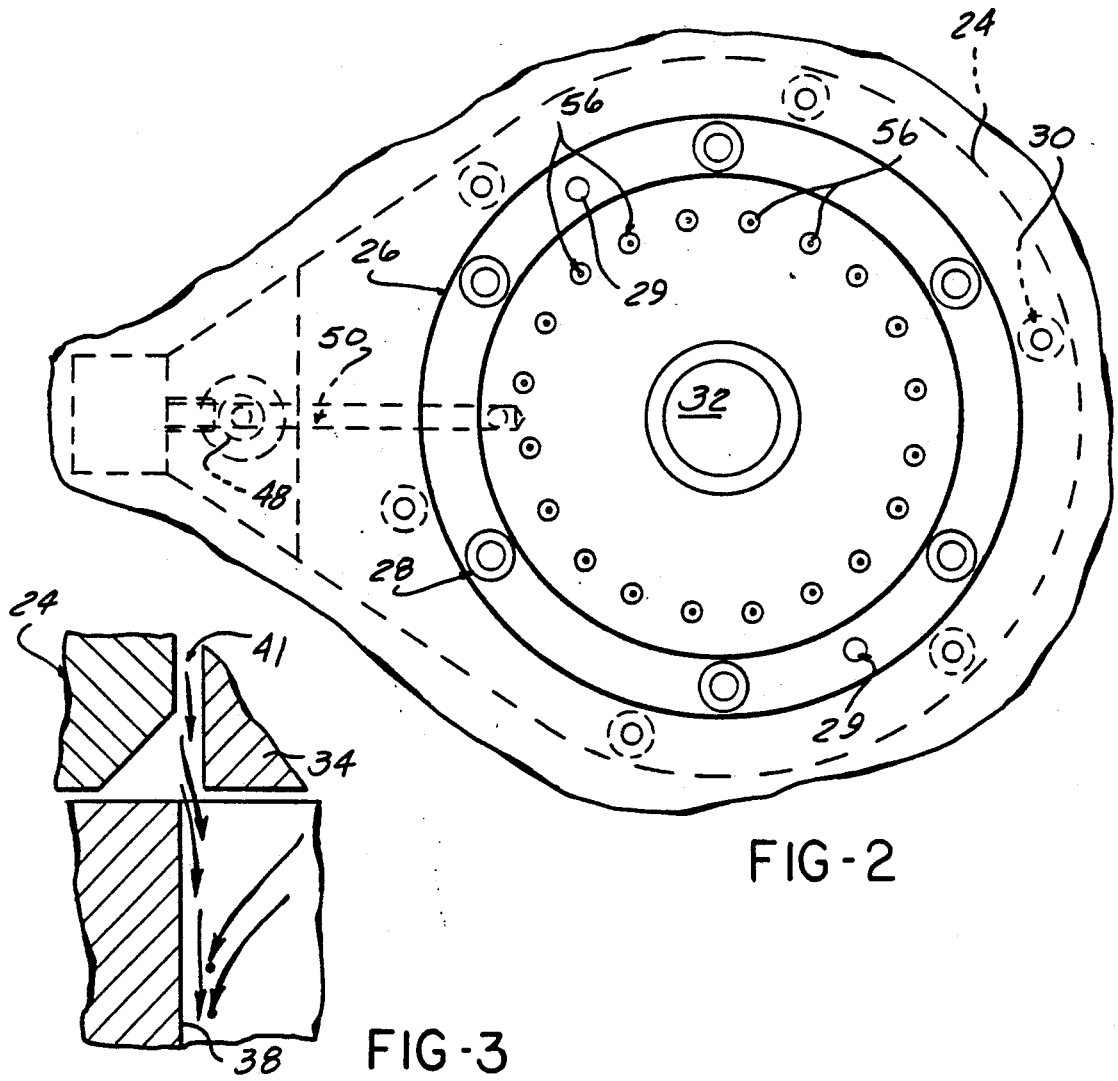
FIG-2
FIG-3

PROCESS AND APPARATUS FOR REDUCING SLAG BUILD-UP ON CHUTE SURFACES

This invention concerns slag chutes which receive and confine the sparks and spatter generated in cutting workpieces with hot discharges, such as plasma arcs or laser beams.

These confinement chutes are positioned below the workpiece at the point of cutting and confine and direct the cutting debris to collection apparatus. The chutes have internal surfaces exposed to the sparks and spatter incidentally produced in cutting workpieces by this process. This spatter consists of very hot fine particles which have a tendency to adhere to surfaces, causing a rapid build up of slag, and thus requiring excessive maintenance to continually remove.

In U.S. Pat. No. 4,338,507 there is described a water wash system for a discharge chute in which a film of water is circulated over the internal surfaces of the chute. The water film quenches the spatter particles and washes the slag from the chute surfaces. The use of water is undesirable in such machines since water supply and contaminated water disposal equipment are required, and water leakage creates significant maintenance efforts. The system also adds significantly to the cost and complexity of the apparatus.

SUMMARY OF THE INVENTION

The present invention comprises a process and apparatus for directing a thin film of a gas such as air, flowing at a high velocity over the chute surfaces exposed to the spatter particles. The relatively low mass spatter particles directed at the chute surfaces are deflected and prevented from directly impacting the protected surface, effectively diminishing the build-up of slag on these surfaces. The air flow also assists in cooling the particles to assist in reducing the tendency for adhesion of the slag particles to assist in reducing the accumulation of slag particles on the protected chute surfaces.

The high velocity gas flow is also advantageously diverted to create an air bearing film atop a ring plate defining the opening through which the hot discharge is directed after passing through a workpiece supported atop the ring. The air bearing film acts to reduce marring of a workpiece slid across the ring during cutting.

DESCRIPTION OF THE DRAWINGS

FIG. 1 is a transverse sectional view through a chute apparatus according to the present invention.

FIG. 2 is a fragmentary plan view of the apparatus shown in FIG. 1.

FIG. 3 is an enlarged diagrammatic representation of the deflecting effect produced by the shielding air flow generated by the apparatus according to the present invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, the apparatus 10 according to the present invention includes a ring plate assembly 12 within an opening 14 in a support table 16. The support table 16 is adapted to support a workpiece W for cutting operations by a hot discharge or jet generating device such as a plasma arc generator 18. The upper surface 20 of the ring plate assembly 12 is positioned to be flush with ball supports (not shown) positioning the workpiece W at that height above the support table 16.

The plasma arc generator 18 is mounted on a carriage 22 having ball rollers 23 engaging the upper surface of the workpiece to hold the workpiece W against the upper surface 20 of the ring plate assembly 12 during cutting operations, in a conventional manner.

The ring plate assembly 12 is comprised of a lower plate 24 secured to an upper plate 26 with cap screws 28, dowels 29 (FIG. 2) used for precision location. The lower plate 24 is in turn secured with cap screws 30 to the underside of the support table 16.

The upper plate 26 is configured to be fit into the opening 14 in the support table 16, protruding above the surface of the table 16 as described above.

The upper plate 26 is formed with central opening 32, having a section 33 diverging within a boss 34 protruding downwardly into an opening 36 in the lower plate 24 with a clearance space therebetween. The downwardly directed plasma arc generator 18 is aligned over the central opening 32 so that the plasma arc is directed downwardly towards an internal bore 38 in a tubular discharge chute 40 located immediately beneath the lower plate 24.

The diameter of the opening 36 in the lower plate 24 is slightly greater than the boss 34 of the upper plate 26 to create an annular space 41 extending into an annular groove 40 machined into the undersurface of the upper plate 26. The groove 40 is sealed by a gasket 42 interposed between the upper plate and lower plate 24, clamped together with the cap screws 28.

The groove 40 is supplied with a gas such as air under pressure from a source 44 directing pressurized air into a port 46 in a block 28 welded to the underside of the lower plate 24. Port 46 enters a drilled passage 48, extending into a cross drilled passage 50, sealed off with a plug 52, passage 50 extending beneath groove 40 and in communication therewith through a hole 54.

Air flowing into groove 40 exits through annular space 41 to create an annular jet of air flowing close to the surface of the bore 38 in the discharge chute 40. The clearance space 41 in one example measured approximately 0.002 inch across, and at an air pressure above 50 psig, flows out of the groove 40 to create a sufficiently strong annular jet to markedly reduce the accumulation of slag on the chute surface defined by bore 38.

This great reduction is believed to result primarily from redirection of the low mass majority of slag particles away from the surface of the chute by the relatively high velocity of the air flow so as to not allow impingement tending to lead to adhesion. This effect is illustrated in FIG. 3. The air flow also creates a substantial cooling effect, which also contributes to a reduction in the tendency for adhesion of the slag particles and consequent substantial reduction in the rate of accumulation of the slag on the inner surfaces of the chute. Finally, the high velocity flow scours the surface to remove such accumulation that does occur.

The surface of the bore 38 and openings 32, 33 of the upper plate 26 are preferably finished to further deter adhesion. A hard chrome plating such as "ARMOLOY" TM, is applied, polished to a 16 microinch rms finish, and has been found to be effective for this purpose.

The air under pressure also exits upwardly through a circular array of small diameter (0.0156") holes 56 onto the surface 20 of the upper plate 26. This air flow creates a film beneath the workpiece W acting as a fluid bearing to minimize marring of the workpiece and to make handling easier.

Other than air, inert gases such as nitrogen could also be employed to reduce the burning of spatter particles.

The above described apparatus and process for protecting the internal surfaces of discharge chutes is much simpler than the water curtain type designs, and yet has surprisingly been found to provide an effective measure against excessive rates of slag accumulation. This approach does not create the troublesome byproduct of contaminated water of those systems.

I claim:

1. Apparatus for confining spatter from a hot discharge arranged to cut a workpiece comprised of a tubular chute having an internal surface surrounding said discharge;

gas jet supply means for directing a high velocity annular jet of gas flow closely adjacent the internal surface of said chute to deflect spatter particles from said surface, whereby the incidence of adhesion of spatter to said surface is greatly reduced;

a ring plate assembly mounted above said chute, said ring plate assembly including an upper plate having a central opening aligned with said hot discharge, and said gas jet supply means including fluid passage means formed in said ring plate assembly terminating in an annular flow passage aligned with and just above said chute internal surface, of a diameter slightly less than the internal surface of said chute to direct said annular gas jet closely adjacent said internal surface of said chute, said ring plate assembly further including a lower plate having an opening formed therein, said upper plate formed with a boss portion interfit into said lower plate opening with a slight clearance therebetween, said clearance comprising said annular flow passage.

2. The apparatus according to claim 1 wherein said gas jet supply means further comprises an annular groove in said upper plate opening into said annular clearance space, and means for supplying pressurized gas to said groove, said apparatus further including a series of ports exiting onto the top of said upper plate to form a gas film for supporting said workpiece thereon.

3. A process for preventing accumulation of spatter particles generated by cutting of a workpiece by a hot discharge on the internal surface of a confinement chute surrounding said hot discharge, comprising the step of directing a jet of gas over said chute surface in a film covering said surface, said jet of a sufficiently high velocity to deflect spatter particles from direct impingement on said surface, and, chrome plating said surface to further reduce the tendency of adhesion of said particles thereto whereby adhesion of spatter particles to said surface is avoided.

4. Apparatus for confining spatter from a hot discharge arranged to cut a workpiece comprised of a tubular chute having an internal surface surrounding said discharge;

gas jet supply means for directing a high velocity annular jet of gas flow closely adjacent the internal surface of said chute to deflect spatter particles from said surface, said gas jet supply means including means defining an annular gap surrounding said discharge immediately beneath said workpiece, said gap of a width on the order of 0.002 inch, and a source of gas at a level over 50 psig communicating with said gap, whereby the incidence of adhesion of spatter to said surface is greatly reduced.

5. Apparatus for confining spatter from a hot discharge arranged to cut a workpiece comprised of a tubular chute having an internal surface surrounding said discharge;

gas jet supply means for directing a high velocity annular jet of gas flow closely adjacent the internal surface of said chute to deflect spatter particles from said surface, said chute internal surface plated with hard chrome and polished to a smooth finish on the order of 16 microinches, whereby the incidence of adhesion of spatter to said surface is greatly reduced.

* * * * *